(12) United States Patent
Topping et al.

(10) Patent No.: US 9,198,126 B2
(45) Date of Patent: Nov. 24, 2015

(54) SYSTEM AND METHOD FOR PROVIDING ENHANCED THROUGHPUT IN A SATELLITE-BASED BROADCAST DATA SERVICE

(71) Applicant: Exelis Inc., McLean, VA (US)

(72) Inventors: Thomas Russell Topping, Phoenix, AZ (US); James William Bishop, Jr., Colorado Springs, CO (US); Robert E. Penny, Jr., Mesa, AZ (US)

(73) Assignee: EXELIS INC., Herndon, VA (US)

( * ) Notice: Subject to any disclaimer, the term of this patent is extended or adjusted under 35 U.S.C. 154(b) by 176 days.

(21) Appl. No.: 13/657,295

(22) Filed: Oct. 22, 2012

(65) Prior Publication Data

US 2014/0113544 A1    Apr. 24, 2014

(51) Int. Cl.
*H04H 20/71*     (2008.01)
*H04W 52/02*    (2009.01)
*H04B 7/185*     (2006.01)

(52) U.S. Cl.
CPC ....... *H04W 52/0203* (2013.01); *H04B 7/18543* (2013.01)

(58) Field of Classification Search
CPC .................................................. H04W 52/0203
USPC .................... 455/3.01, 12.1, 427, 422.1, 429
See application file for complete search history.

(56) References Cited

U.S. PATENT DOCUMENTS

| 5,410,728 | A | 4/1995 | Bertiger et al. |
| 5,574,968 | A | 11/1996 | Olds et al. |
| 5,603,079 | A | 2/1997 | Olds et al. |
| 5,613,194 | A | 3/1997 | Olds et al. |
| 5,721,534 | A | 2/1998 | Olds et al. |
| 5,905,443 | A | 5/1999 | Olds et al. |
| 6,628,919 | B1 * | 9/2003 | Curello et al. ............... 455/12.1 |
| 6,714,780 | B1 * | 3/2004 | Antonio et al. ............... 455/425 |
| 7,792,487 | B2 * | 9/2010 | Monte et al. ................. 455/12.1 |
| 2006/0071849 | A1 * | 4/2006 | Howle et al. ............. 342/357.08 |
| 2007/0026795 | A1 * | 2/2007 | de La Chapelle ............ 455/13.4 |
| 2012/0188880 | A1 * | 7/2012 | Beeler et al. ................. 370/246 |
| 2013/0009809 | A1 * | 1/2013 | Bert et al. ..................... 342/354 |

OTHER PUBLICATIONS http://www.reuters.com/finance/stocks/companyProfile?symbol=IRIDQ.PK, [downloaded—MAR. 10, 2015], pp. 1-2.
The Global Network: Satellite Constellation, Jul. 2012 pp. 1-2.
https://www.iridium.com//SearchResults.aspx?q=paging, [downloaded—Mar. 10, 2015], p. 1.

* cited by examiner

*Primary Examiner* — Sanh Phu
(74) *Attorney, Agent, or Firm* — The Watson IP Group, PLC; Dan Fiul

(57) ABSTRACT

A method is provided that enhances the throughput of data broadcasts in a multi-beam satellite communication system by taking advantage of target users whose normal environment or equipment provide a better channel performance than that of the nominal environment or equipment for which the system is tuned, which enables a larger coverage area per beam than the nominal design supports. A system is provided that operates the method. A preferred embodiment is described using the Iridium Mobile Satellite Service (MSS) system as a basis.

42 Claims, 13 Drawing Sheets

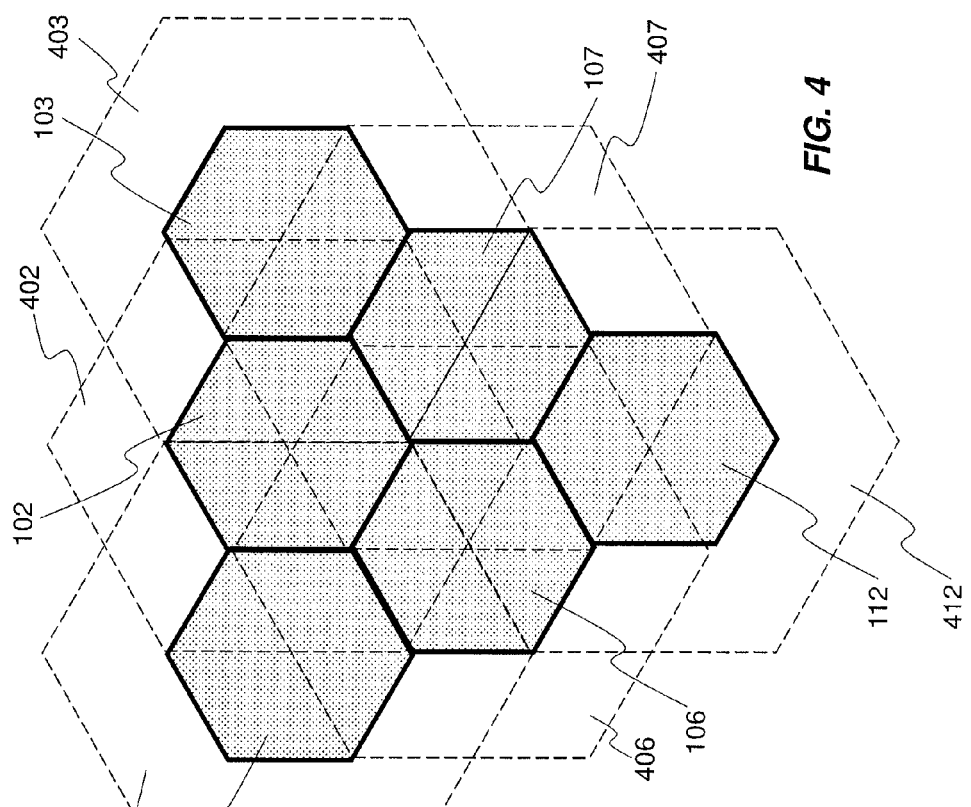
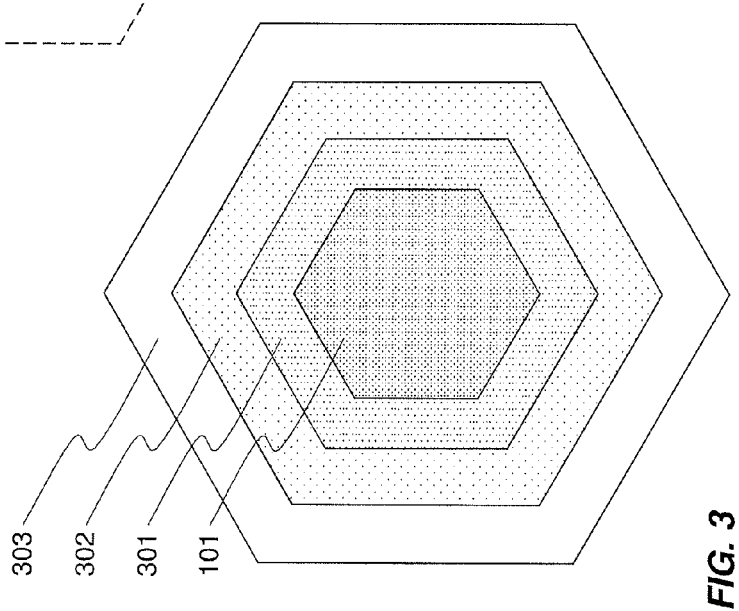
FIG. 4
FIG. 3

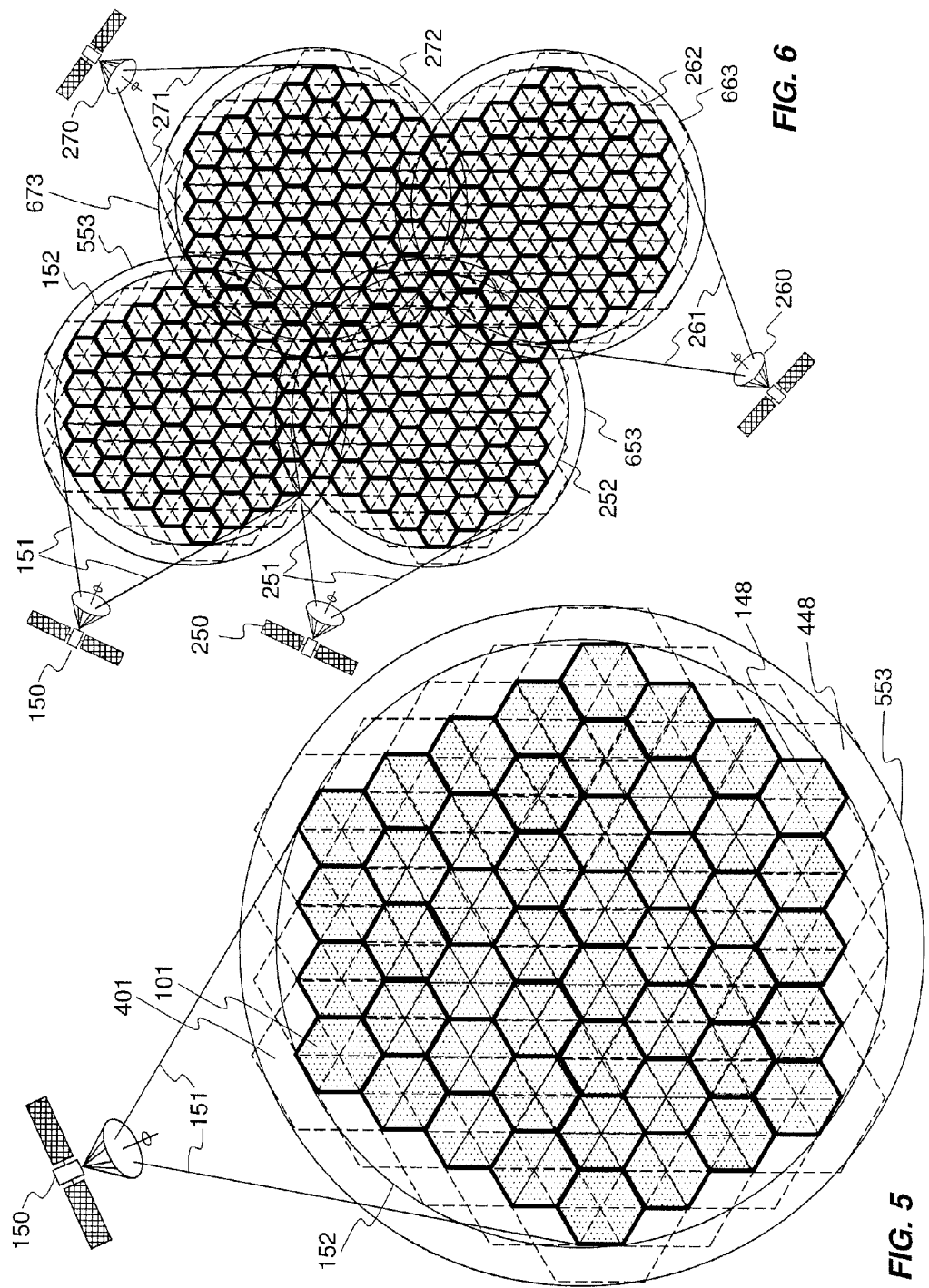

US 9,198,126 B2

SYSTEM AND METHOD FOR PROVIDING ENHANCED THROUGHPUT IN A SATELLITE-BASED BROADCAST DATA SERVICE

The present application claims priority from U.S. Provisional No. 61/665,503, entitled "SYSTEM AND METHOD FOR PROVIDING ENHANCED THROUGHPUT IN A SATELLITE-BASED BROADCAST DATA SERVICE", to Topping et al., filed Jun. 28, 2012, the entirety of which is explicitly incorporated herein by reference.

BACKGROUND OF THE INVENTION

1. Technical Field of the Invention

This invention pertains in general to satellite-based broadcast data service. The invention pertains in particular to a method of enhancing the throughput of broadcast data service in communication systems utilizing satellites and multiple spot-beam coverage patterns.

2. Background of the Invention

Satellite broadcast technology has proven over a period of several decades to be an efficient and effective means of providing one-to-many data communication. Such service is usually provided using satellites in geostationary orbit, often referred to as "GEO" satellites. This approach has a lower complexity and, often, lower total system cost than other alternatives, due to the economies of scale associated with the broad field of view available at that orbit altitude.

Communication systems that use satellites in Low Earth Orbit (usually abbreviated to "LEO") and Medium Earth Orbit ("MEO") also exist. LEO-based systems, of which Iridium is perhaps the most successful example to date, are particularly well suited for two-way communication because of the reduced signal propagation time and power requirements associated with the lower orbit altitude. MEO-based systems can be optimized for either two-way or broadcast capability; the Global Positioning System (GPS) is a successful example of using a MEO constellation for a broadcast service.

While the reduced signal propagation time and power requirements of a LEO constellation offer strong advantages for two-way communication, those benefits are also applicable to broadcast services. The Iridium Mobile Satellite Services (MSS) system in particular, with its global coverage and multiple spot beams, has a great potential for carrying broadcast data. In fact, that system utilizes broadcast-oriented logical and physical channels to provide system information required for devices to access its two-way services. Refer to U.S. Pat. No. 5,410,728 for basic information about Iridium, and U.S. Pat. No. 5,574,968 for a detailed description of how Iridium uses broadcast channels to support two-way services.

Iridium also provides a one-way service, usually called Paging and sometimes referred to as Directed Messaging Service (DMS). Historically this capability has been used to send individually addressed numeric and text messages to specific receivers, using a high-power transmission as described in U.S. Pat. Nos. 5,603,079 and 5,613,194. A corporate profile associated with a company that was once responsible for operating the Iridium system, http://www.reuters.com/finance/stocks/companyProfile?symbol=IRIDQ.PK, identifies the paging service power level as having "a signal strength of approximately 26 dB," as compared with the "signal strength for voice communication that averages approximately 16 dB." This 10 dB advantage provides significant additional building penetration or signal reliability, depending on the receiver's needs and use cases.

With the well-known demise of one-way paging in general across the telecommunication industry, and the lack of new growth in Iridium Paging specifically (documented at http://www.iridium.com/SearchResults.aspx?q=paging by the current Iridium operating company), the associated resources are ripe for exploitation by a new broadcast service in which groups of users in multiple locations receive the same data sent just once in each relevant satellite spot beam. Since each spot beam of an Iridium satellite nominally covers an area that is approximately 250 miles in diameter, as noted in a document available from Iridium at http://www.iridium.com/DownloadAttachment.aspx?attachmentID=1197, such a service offers a significant potential for very large numbers of users to receive a single message broadcast using this capability, with minimal demands on the transmission capacity of the satellites.

It should be noted that this new broadcast service does not by itself require any inventive step for receiving devices. Simply creating multiple receiver devices with the same address is sufficient, and may already have been accomplished for unauthorized purposes through device "cloning," a well-known practice that has plagued the wireless telecommunications industry since its inception. What is needed is a set of novel enhancements to this basic capability that, taken together, convert it from a hack to a genuine service.

It is thus a principal aim of the present invention to provide a system that supports broadcasting with global or regional scope, for groups of receivers located anywhere in the world whether in close proximity to one another or widely distributed, and offering multiple data services sourced by multiple data providers. It is a further aim of the present invention to increase the capacity of the underlying satellite transmission facility through a method that optimizes resource utilization using novel techniques and construction not found in the prior art.

SUMMARY OF THE INVENTION

In accordance with the principles of the present invention, a method of reducing power usage of a multi-beam satellite system comprises a determination of a coverage area, for a particular beam from a multi-beam satellite system, based on a reception parameter independent of transmission power associated with the particular beam, and adjustment of a transmission parameter, independent of the transmission power, associated with the particular beam to transmit a data message to a user device. The adjusted transmission parameter reduces power usage of the multi-beam satellite system.

In further accordance with the principles of the present invention, a system for reducing power usage of a multi-beam satellite system comprises a broadcast controller to determine a coverage area for a particular beam from a multi-beam satellite system based on a reception parameter independent of transmission power associated with the particular beam, and adjust a transmission parameter, independent of the transmission power, associated with the particular beam to transmit a data message to a user device, and an output handler to output the data message, via a satellite system access network, to a user device. The adjusted transmission parameter reduces power usage of the multi-beam satellite system.

In further accordance with the principles of the present invention, a system for reducing power usage of a multi-beam satellite system comprises a broadcast controller to determine a coverage area for a particular beam from a multi-beam satellite system based on a reception parameter independent of transmission power associated with the particular beam, and adjust a transmission parameter, independent of the transmission power, associated with the particular beam to transmit a data message to a user device, and an output handler to output the data message, via a satellite system access network, to a user device. The adjusted transmission parameter reduces power usage of said multi-beam satellite system.

In further accordance with the principles of the present invention, a broadcast controller device comprises an input handler to receive a delivery request for a data message from a broadcast originator device, a scheduler to determine a coverage area, for a particular beam from a multi-beam satellite system, based on a reception parameter independent of transmission power associated with the particular beam, and adjust a transmission parameter, independent of the transmission power, associated with the particular beam to transmit the data message to a user device. An output handler sends transmission requests associated with the data message to a satellite system access network. The adjusted transmission parameter reduces power usage of the multi-beam satellite system

BRIEF DESCRIPTION OF THE DRAWINGS

Features and advantages of the present invention will become apparent to those skilled in the art from the following description with reference to the drawings. The invention will be better understood from a reading of the following detailed description in conjunction with the drawing figures, in which like reference designators are used to identify like elements and in which:

FIG. 3 illustrates a single beam's nominal and enlarged coverage areas at the nominal received power level in multiple channel conditions including nominal and better, in accordance with the principles of the present invention;

FIG. 4 illustrates an example subset of a multi-beam coverage resulting from both nominal coverage areas at the nominal received power level and enlarged coverage areas in a selected better than nominal channel condition, in accordance with the principles of the present invention;

FIG. 5 illustrates a multi-beam coverage pattern projected on the surface of the earth by a satellite, each beam having an enlarged coverage area at the nominal received power level due to better than nominal channel conditions, in accordance with the principles of the present invention;

FIG. 6 illustrates several adjacent multi-beam coverage patterns projected on the surface of the earth by a number of satellites, each beam having an enlarged coverage area at the nominal received power level due to better than nominal channel conditions, in accordance with the principles of the present invention;

DETAILED DESCRIPTION OF THE PREFERRED EMBODIMENTS

Figures 1, 2:
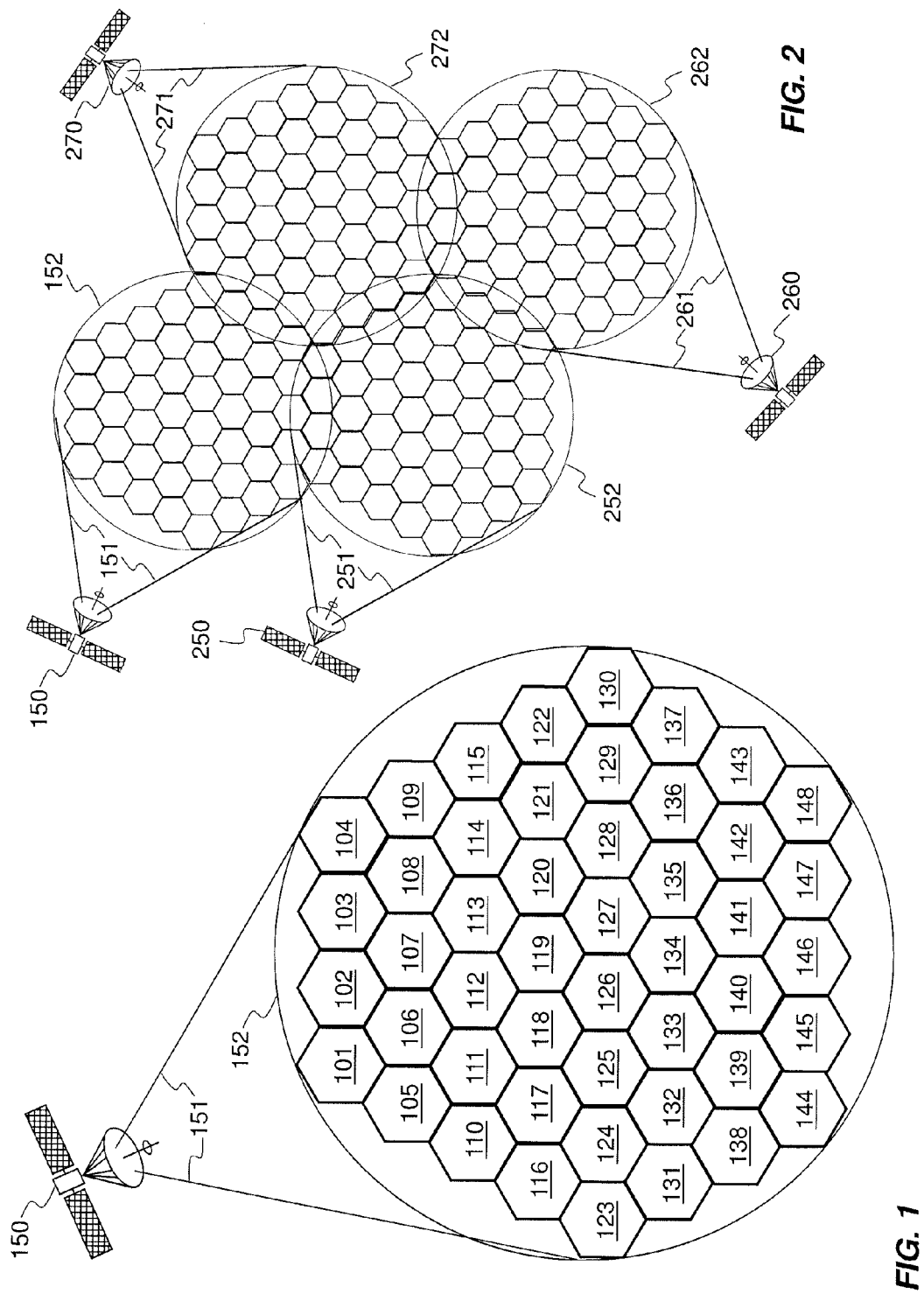
FIG. 1 illustrates a multi-beam coverage pattern projected on the surface of the earth by a satellite, each beam having a nominal coverage area according to the nominal received power level in nominal channel conditions, in accordance with the principles of the present invention.
FIG. 2 illustrates several adjacent multi-beam coverage patterns projected on the surface of the earth by a number of satellites, each beam having a nominal coverage area according to the nominal received power level in nominal channel conditions, in accordance with the principles of the present invention.

Accordingly, the present invention provides a set of methods that can be applied to the transmission facilities of an existing multi-beam satellite communications system, thereby enabling the desired broadcast service while at the same time optimizing the resource utilization for multiple users, both data senders and receivers. The invention further provides a system architecture that overlays an existing system with additional components to effect these novel methods and realize their benefits.

In the most general case, any multibeam satellite system with any transmission power profile can be used as a basis upon which to apply the methods and additional apparatus of the present invention. The preferred embodiment described here builds upon the Paging channels of the Iridium system as they have been described in the references cited above—U.S. Pat. Nos. 5,603,079 and 5,613,194 for overall design, and the old company profile at http://www.reuters.com/finance/stocks/companyProfile?symbol=IRIDQ.PK for the detail regarding operating power levels. The service to which the present invention is preferably applied is the Iridium Global Data Broadcast (GDB) service, which is designed to transmit messages up to several thousand bytes to an unlimited number of receivers within a target delivery area. Each message is addressed to a unique group, and any number of devices may be configured to receive messages to that address. GDB is built upon the Iridium Paging channel described in U.S. Pat. No. 5,603,079, but it uses a timing hierarchy that supports low-latency delivery and a message format that enables group-directed broadcasting capability, instead of the long cycle and individual addressing techniques designed to support individual low-power pagers that are described there and in related U.S. Pat. Nos. 5,613,194, 5,721,534, and 5,905,443.

The present invention takes advantage of the observation that in a typical satellite communication system, the downlink broadcast channels used for call notification and/or simplex message delivery service are transmitted at a power level that accommodates the most disadvantaged user for which the system is designed, yet many if not most users are in positions or using equipments that afford more favorable channel conditions much if not most of the time. For some entire categories of users, these more favorable conditions prevail all the time. That is, a transmit power level designed to provide a system link margin of 26 dB, for example, offers high probability of delivery to all target users, but a significant number of target users would experience acceptable service even if the system link margin were, for example, only 16 dB, and other users would receive acceptable service with a system link margin of, for example, only 6 dB. The present invention recognizes these categories of users and, rather than reconfiguring the transmission power dynamically when sending messages to them, which may not be possible and is assumed in general to be infeasible in a typical existing system, instead calculates a larger effective coverage area for each beam used to deliver messages to those users.

The method of the present invention thus reduces the number of transmissions required to ensure receipt of the message within a particular area served by multiple beams, by calculating beam coverage areas according to the target receivers' known more-favorable channel condition rather than the worst-case user's disadvantaged channel condition. This reduction in transmissions for each message can result in overall power savings in the satellites, or it can enable an increase in the effective message throughput for the same total transmission power.

The method of the present invention also takes advantage of the LEO or MEO nature of the satellite system, which causes the multiple-beam coverage pattern of each satellite in the system to move across the surface of the earth in a highly predictable manner, following the orbital track of the satellite. This movement leads to different numbers of beams being required to illuminate a particular target region at different times. Knowing that certain groups of users would prefer to tolerate some additional delay to minimize the number of beams, and therefore the number of transmissions and corresponding cost, required to deliver the data to their target region, while others would prefer to minimize delay regardless of the cost in number of transmissions, the method of the present invention considers these factors in scheduling transmissions for each such user group.

The above and other advantages of the present invention are carried out in one form by a system of cooperating elements, each of which performs a specific role according to the method of the invention, as described in the sequel.

FIG. 1 illustrates a multi-beam Coverage Pattern 152 projected on the surface of the earth by Antenna Projections 151, which are implemented as selective gain areas of an antenna on Satellite 150, in accordance with the principles of the present invention. Each beam of Pattern 152 is represented for convenience as a regular hexagon, but actual beams may vary in both shape and size. Pattern 152 is shown with a regular arrangement of 48 beams, numbered here as Beam 101 through Beam 148. This coincides with the actual number of beams an Iridium satellite projects, thereby representing a preferred embodiment. The size of the beams in that preferred embodiment based on Iridium is roughly 250 miles across on average, as noted previously. It will be understood by those skilled in the art that any other number, arrangement, or size of beams will serve the interests of the present invention.

Coverage Pattern 152 and Beams 101 through 148 are shown here as having a specific size. The sizes of each correspond to the area in which Satellite 150 offers service at a nominal signal strength. Outside each beam, the signal strength experienced by a user with nominal equipment in nominal channel conditions will be less than nominal, meaning that such a user will be effectively outside the beam.

FIG. 2 illustrates several adjacent multi-beam Coverage Patterns 152, 252, 262, and 272, projected on the surface of the earth by Antenna Projections 151, 251, 261, and 271, respectively, which are implemented as selective gain areas of corresponding antennas on Satellites 150, 250, 260, and 270, respectively, in accordance with the principles of the present invention. Satellite 150, its Antenna Projections 151, and its corresponding Coverage Pattern 152, are the same entities in FIG. 2 as those shown in FIG. 1, thereby illustrating the extension of multi-beam coverage across large areas through the use of multiple satellites. In a preferred embodiment based on the Iridium MSS system, enough satellites are present to cover the entire Earth. As in FIG. 1, each beam is shown as having a nominal coverage area according to the nominal received power level in nominal channel conditions. Beams 101 through 148 are replicated within Coverage Pattern 152 as idealized hexagons, but they are unlabeled to avoid cluttering the diagram. Coverage Patterns 252, 262, and 272 also are formed from beams that are shown as idealized hexagons and unlabeled to avoid clutter.

FIG. 3 illustrates the physical phenomenon exploited in accordance with the principles of the present invention. A single beam, such as Beam 101, has a nominal coverage area according to the nominal received power level in nominal channel conditions. Because real antennas have a gradual roll-off in performance rather than a sharp edge, energy transmitted from a real antenna is present and detectable by a receiver outside the nominal coverage area for Beam 101. Normally this additional energy is simply wasted, and the excess energy within the nominal coverage area is considered as necessary for serving devices experiencing channel conditions that are worse than nominal. However, for the purposes of the present invention, this phenomenon can be considered as providing additional coverage area at the nominal power level for devices using better equipment than nominal or experiencing better channel conditions than nominal. The present invention targets just such devices, which are known to be a significant subset of real users.

In FIG. 3, Extended Coverage Areas 301, 302, and 303 corresponding to energy from Beam 101 that satisfies the nominal power level for three different exemplary channel conditions that are better than the nominal conditions within Beam 101. Depending on the specific antenna design, the actual area of additional coverage will vary, but for the purposes of the present invention it can always be measured and characterized. For example, Extended Coverage Area 301 extends the coverage radius approximately 50% beyond the nominal radius of Beam 101, and expands the coverage area by a factor of 2.25, while supporting devices whose channel condition may be 3 dB better than nominal. Similarly, Extended Coverage Area 302 extends the coverage radius approximately 100% beyond that of Beam 101, and expands the coverage area by a factor of 4, while supporting devices whose channel condition is 6 dB better than nominal. In the final example, Extended Coverage Area 303 extends the coverage radius approximately 150% beyond that of Beam 101, and expands the coverage area by a factor of 6.25, while supporting devices whose channel condition is 9 dB better than nominal. Various other parameters besides simple distance may also contribute to the selection of an effective coverage radius for any given Extended Coverage Area, including target equipment antenna gain, target equipment altitude, and desired building penetration. If appropriate data is available and the signal is affected significantly by it, even real-time local weather conditions or "space weather" such as regional ionospheric distortions may be taken into consideration.

FIG. 4 illustrates an example subset of a multi-beam coverage resulting from both nominal coverage areas at the nominal received power level and enlarged coverage areas in a selected better than nominal channel condition, in accordance with the principles of the present invention. Beams 101, 102, 103, 106, 107, and 112 form a portion of the Coverage Pattern 152 from FIG. 1. Their nominal coverage areas are outlined here in the solid hexagons. Each beam is accompanied by an Extended Coverage Area 401, 402, 403, 406, 407, and 412, respectively, with radius approximately 100% larger and area approximately 4 times as large, and shown here outlined by dashed hexagons.

FIG. 5 then shows the entire Coverage Pattern 152 from FIG. 1, in accordance with the principles of the present invention, with each Beam 101 through 148 accompanied by a corresponding Extended Coverage Area 401 through 448; to avoid clutter in the diagram only Beams 101 and 148, with their respective Extended Coverage Areas 401 and 448, are labeled. The aggregate of all the Extended Coverage Areas 401 through 448 is shown as Extended Coverage Pattern 553.

FIG. 6 in turn repeats the multi-satellite diagram of FIG. 2, with each Coverage Pattern 152, 252, 262, and 272 accompanied by its respective Extended Coverage Pattern 553, 653, 663, and 673, in accordance with the principles of the present invention.

Figure 7:
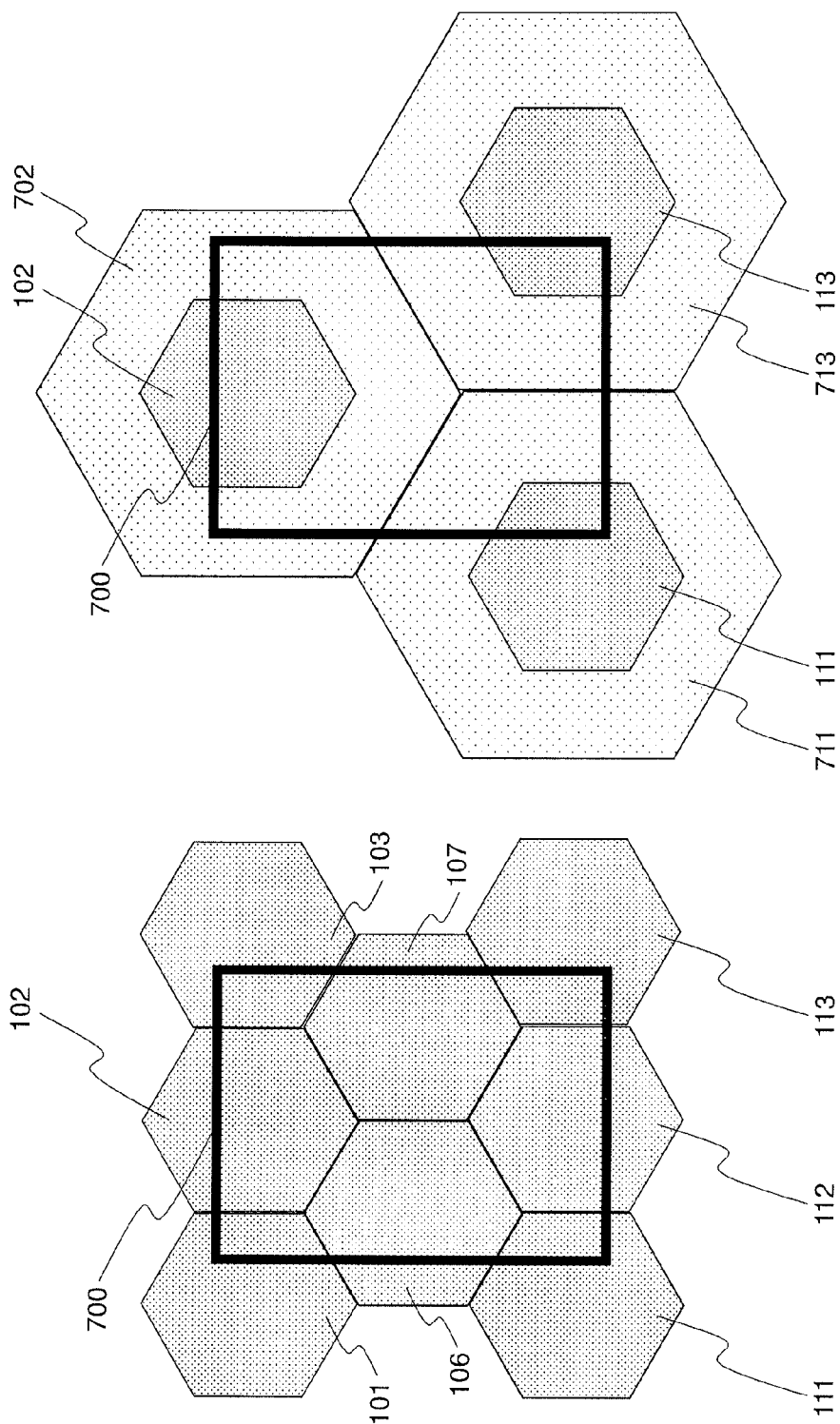
FIG. 7 illustrates a reduction of total satellite transmission power to cover a particular target region, by leveraging the enlarged coverage area of each beam due to better than nominal channel conditions, in accordance with the principles of the present invention.
Figure 8:
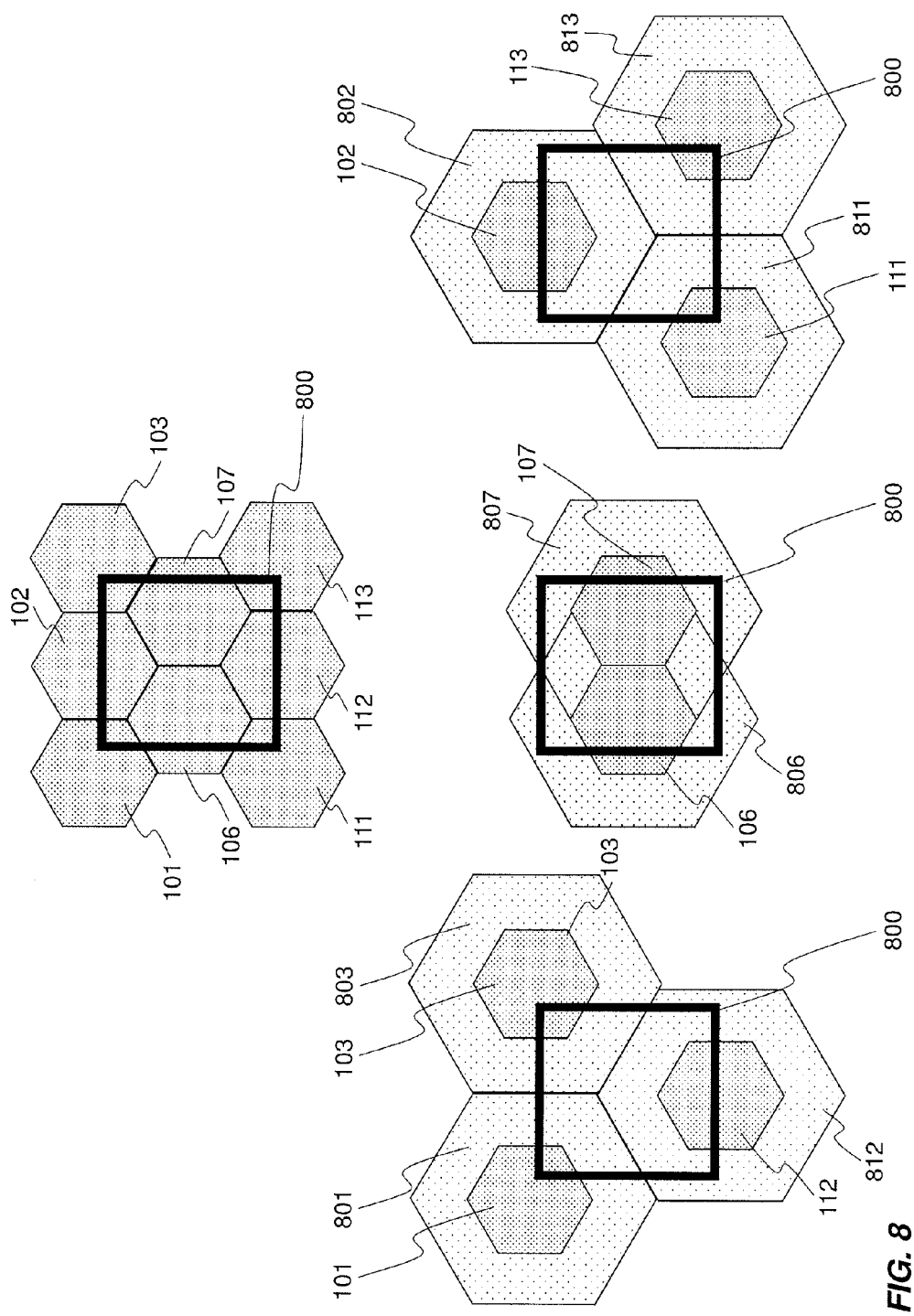
FIG. 8 illustrates an increase in total effective data throughput into a particular target region, for the same satellite transmission power, by leveraging the enlarged coverage area of each beam due to better than nominal channel conditions, in accordance with the principles of the present invention.
Figure 9:
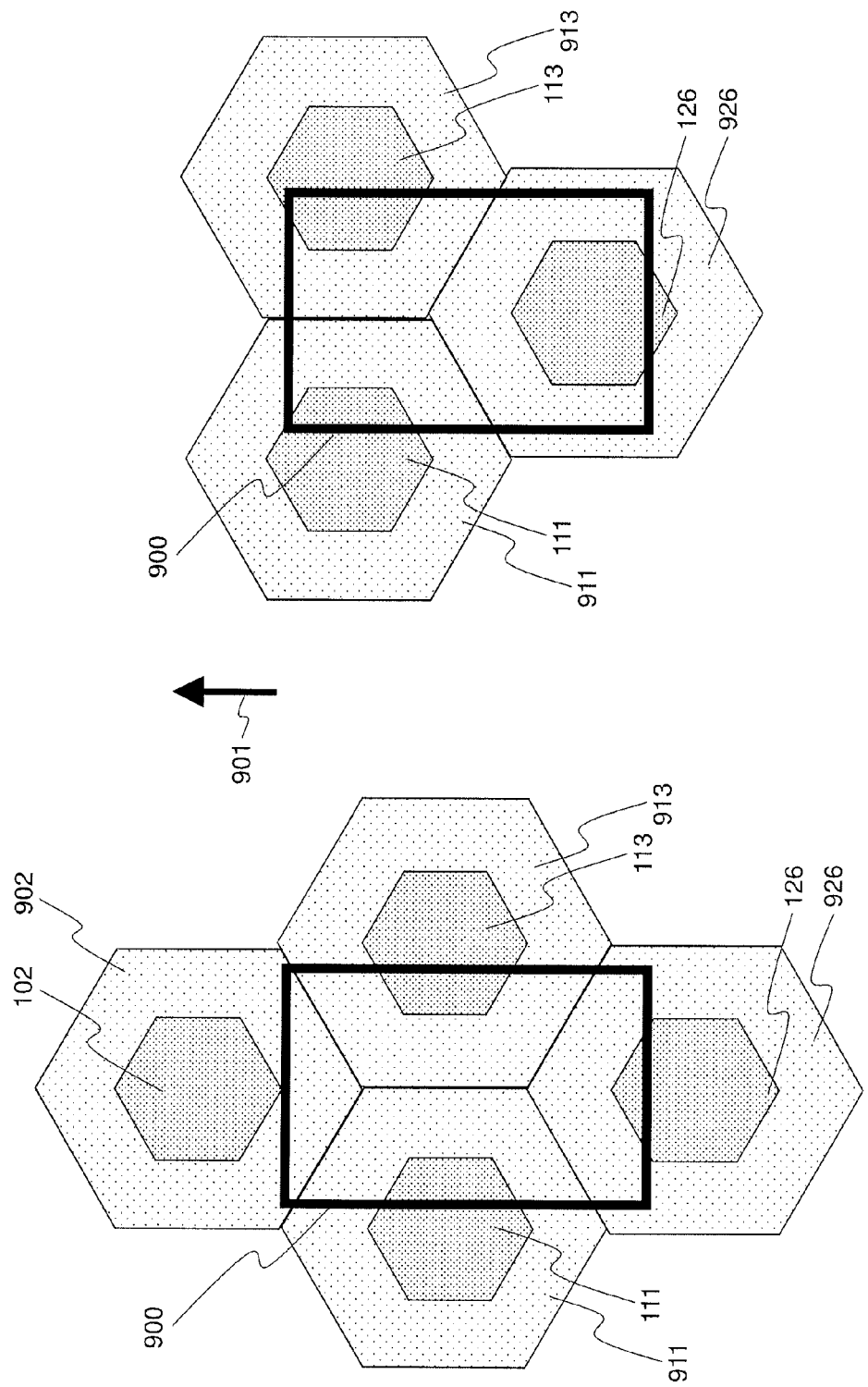
FIG. 9 and FIG. 10 illustrate how waiting for predictable changes in beam coverage due to satellite movement can optimize the number of beams required to cover a particular target region, in accordance with the principles of the present invention.
Figure 10:
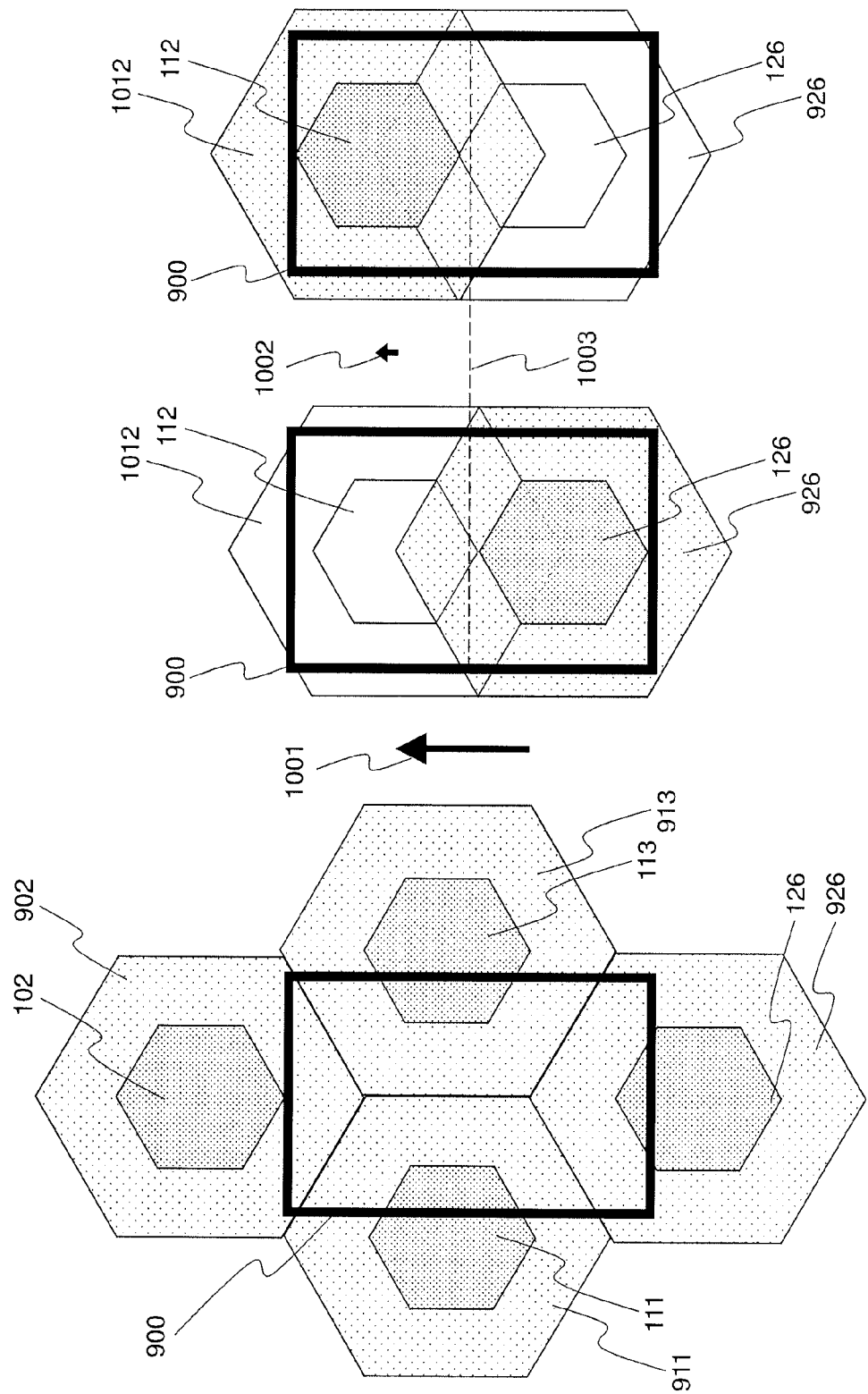

The diagrams of FIG. 1 through FIG. 6 thus provide a background against which the specific reduced transmission count and increased bandwidth phenomena illustrated by the diagrams of FIG. 7 and FIG. 8 respectively, and the delay/energy tradeoff phenomenon illustrated by the diagrams of FIG. 9 and FIG. 10, can be described.

FIG. 7 illustrates a reduction of total satellite transmission power to cover a particular Target Region 700, in accordance with the principles of the present invention. On the left side of the diagram is depicted a subset of multibeam Coverage Pattern 152 (not shown), consisting of Beams 101, 102, 103, 106, 107, 111, 112, and 113. At the nominal receive power level and nominal channel condition, a message would have to be transmitted in every one of the Beams shown in order to ensure that receivers throughout Target Region 700 can receive it. However, for any group of receivers that can be expected to experience better channel conditions than the nominal, such as those that use equipment with a stronger receive antenna, or those that are known to be outdoors at all times, fewer transmissions are required.

On the right side of the diagram is depicted a subset of multibeam Coverage Pattern 152 (not shown) comprising only Beams 102, 111, and 113, along with their respective Extended Coverage Areas 702, 711, and 713. Because the group of receivers in Target Region 700 are known to have better than nominal channel conditions, by an amount that corresponds to the larger beam footprint associated with the Extended Coverage Areas as shown, a message would have to be transmitted in only Beams 102, 111, and 113 to be received throughout Target Region 700.

The present invention can use this phenomenon to reduce total transmission power, which is usually a precious resource in satellite systems, for messages broadcast to groups known to always have better than nominal equipment or channel conditions. Those skilled in the art will appreciate that the exact power reduction factor will depend on the projected antenna pattern and corresponding beam-edge rolloff performance, as well as the target supranominal channel conditions or equipment. In any case, these design points can be characterized and incorporated in the algorithm used to schedule transmissions.

FIG. 8 illustrates an increase in total effective data throughput into a particular Target Region 800, in accordance with the principles of the present invention. At the top of the diagram is depicted a subset of multibeam Coverage Pattern 152 (not shown), consisting of Beams 101, 102, 103, 106, 107, 111, 112, and 113. At the nominal receive power level and nominal channel condition, a message would have to be transmitted in every one of the Beams shown in order to ensure that receivers throughout Target Region 800 can receive it. Only one such message could be delivered for a given set of transmission opportunities in those Beams. However, for any group of receivers that can be expected to experience better channel conditions than the nominal, such as those that use equipment with a stronger receive antenna, or those that are known to be outdoors at all times, fewer transmissions are required.

Accordingly, the same Beams and transmission opportunities can be used to deliver multiple different messages, three in this example, either to the same group or to different groups in Target Region 800, by arranging the transmissions as shown in the bottom part of the diagram. On the left, Beams 102, 103, and 112 can serve Target Region 800 completely via their respective Extended Coverage Areas 801, 803, and 812. In the middle, Beams 106 and 107 can serve Target Region 800 completely via their respective Extended Coverage Areas 806 and 807. On the right, Beams 102, 111, and 113 can serve Target Region 800 completely via their respective Extended Coverage Areas 802, 811, and 813. Because Target Region 800 is covered by multiple independent Beam subsets, three in this example, the effective message delivery throughput into Target Region 800 is three times what would otherwise be achievable.

The present invention can use this phenomenon to increase effective bandwidth in regions like Target Region 800 that require higher message delivery throughput, for messages broadcast to groups known to always have better than nominal equipment or channel conditions. Those skilled in the art will appreciate that the exact bandwidth increase factor will depend on the projected antenna pattern and corresponding beam-edge rolloff performance, as well as the target supranominal channel conditions or equipment. In any case, these design points can be characterized and incorporated in the algorithm used to schedule transmissions.

FIG. 9 and FIG. 10 illustrate a trade-off, in accordance with the principles of the present invention, between message delivery time and total transmission power required to deliver a message to Target Region 900, for LEO and MEO satellite systems in which the beam coverage moves across the surface of the Earth along with the satellites' orbital motion. In the example of FIG. 9, the moment in time depicted on the left demonstrates the need to provide transmissions in the four Beams 102, 111, 113, and 126 to illuminate all of Target Region 900 with a particular message. As in FIG. 7, Extended Coverage Areas 902, 911, 913, and 926, respectively, are used to advantage rather than having to fill in with additional beams not shown here, but that can be seen by referring back to FIG. 1. It should be noted that while this principle is illustrated with extended coverage areas, nothing prevents its application to nominal coverage areas.

The right side of FIG. 9 depicts the beam configuration over Target Region 900 at a moment in time somewhat after the moment depicted on the left, after the corresponding satellite has traveled the distance, and in the direction of travel, shown as Movement Indicator 901. Those skilled in the art will recognize that the exact time and distance will vary according to the specific satellite system in which this phenomenon is being observed, as well as the size and shape of the specific target region. In a preferred embodiment of the present invention, based on the Iridium MSS system with its beam scale of roughly 250 miles across and its orbit of roughly 485 miles altitude, the latter of which corresponds to an orbital velocity of roughly 17,000 miles per hour and a ground-track velocity of roughly 240 miles per minute, the example shown in FIG. 9 represents approximately 35 seconds of additional delay waiting for an optimal beam configuration.

In the example of FIG. 10, additional transmission count reduction is accomplished, at the expense of additional delay, by using just two Beams, 126 and 112, from the original pattern in FIG. 1. On the left of FIG. 10 is the same pattern shown on the left of FIG. 9, again depicting the number of Beams, 102, 111, 113, and 126, required to illuminate Target Region 900 at that particular sub-optimal moment. To optimize down to just two transmissions in this example, Beam 126 and its Extended Coverage Area 926 are used to transmit into Target Region 900 after the corresponding satellite has traveled the distance, and in the direction of travel, shown as Movement Indicator 1001. In a preferred embodiment, this represents approximately 50 seconds of additional delay. Beam 112 and its Extended Coverage Area 1012 are shown at this time with no shading, to represent that no transmission occurs, because at this time Extended Coverage Area 1012 is not in a position to illuminate the remainder of Target Region 900 that is not being illuminated by Extended Coverage Area 926.

The second transmission occurs in Beam 112 and its Extended Coverage Area 1012 after another travel allowance shown as Movement Indicator 1002, representing about 12 additional seconds in a preferred embodiment. Here again, Beam 126 and its Extended Coverage Area 926 are shown with no shading, for the same reason as given above for the unshaded areas at the earlier time. Only with both travel delays is Target Region 900 completely covered in this example. Dividing Line 1003 is provided as a visual aid to demonstrate in the drawing that Target Region 900 is indeed completely covered by the two transmissions in Beams 126 and 112 at the times and in the positions shown.

The present invention can use this phenomenon to minimize transmission power utilized for message delivery to delay-tolerant users in regions like Target Region 900, again for messages broadcast to groups known to always have better than nominal equipment or channel conditions. Those skilled in the art will appreciate that the exact minimal power and optimal additional delay will depend on the projected antenna pattern and corresponding beam-edge rolloff performance, as well as the target supranominal channel conditions or equipment, and the relative delay tolerance of target user groups. In any case, these design points can be characterized and incorporated in the algorithm used to schedule transmissions.

Any or all of the phenomena depicted in FIG. 3 and FIG. 7 through FIG. 10 can be exploited simultaneously and in varying degrees to optimize mutually among average user group channel condition or equipment, total satellite transmission power per message, regional bandwidth, and user group delay tolerance. Ultimately, all the factors chosen for a particular message, or for a class of messages associated with a particular user group, can affect the price of the service. The method by which these factors are chosen and weighed against one another forms the heart of the present invention, and is depicted as the flow chart shown in FIG. 11.

Figure 11A:
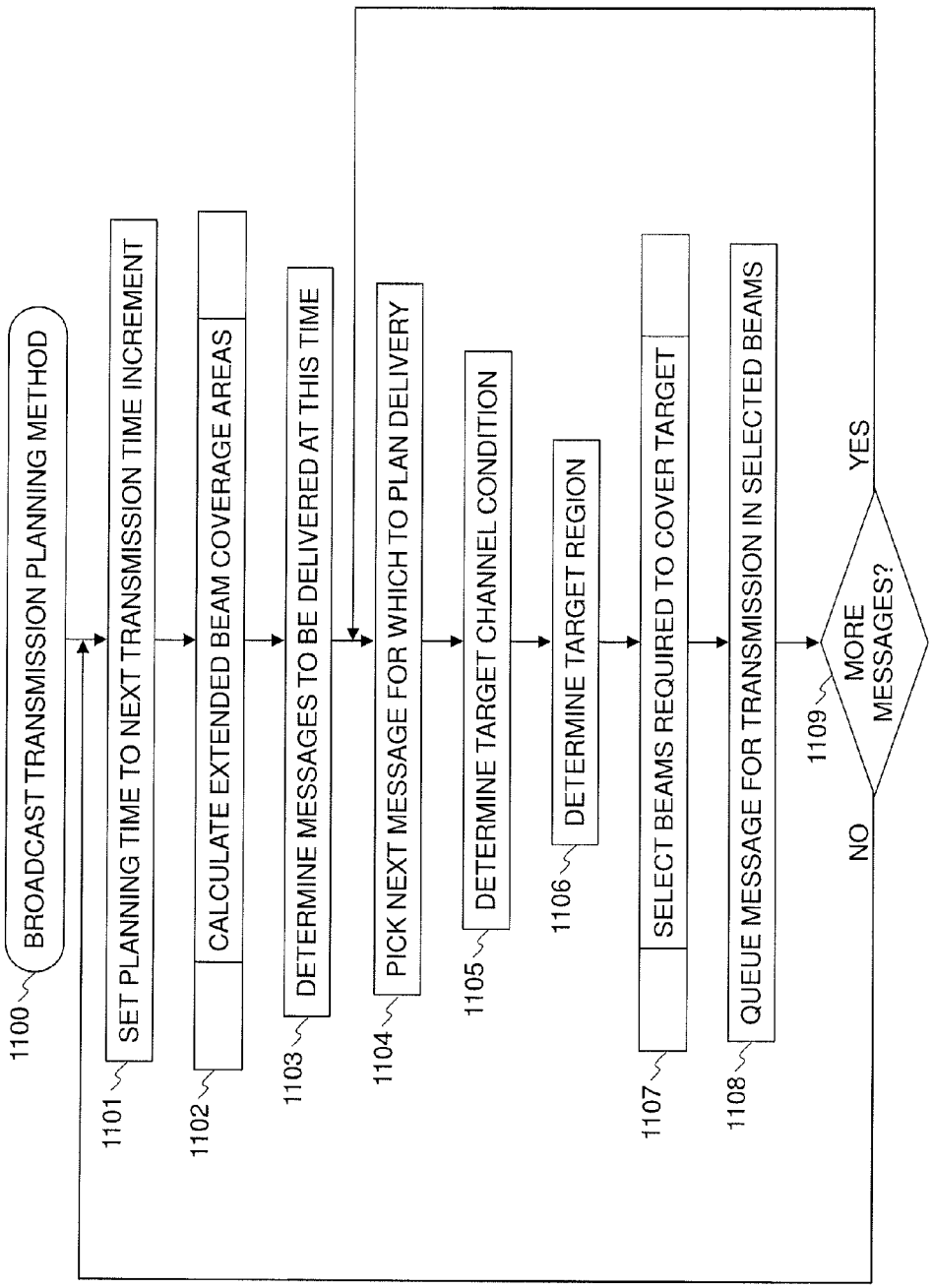
FIGS. 11A-E are flow charts for a method of selecting beams for each broadcast message according to the level of service required and system operational settings regarding transmission power and data throughput, and taking into account the corresponding coverage areas of each beam, in accordance with the principles of the present invention.

FIGS. 11A-E comprise a top level flow and multiple subroutines, in accordance with the principles of the present invention, depicted on five separate sheets, due to its complexity. The top level flow is shown in FIG. 11A as Process 1100 named Broadcast Transmission Planning Method. This process is designed to run endlessly, planning broadcast message transmissions to occur at each increment of time, where time increments are defined by the capabilities of the satellite system to which the method is being applied. Broadcast messages are fed to this process by any of several well-known request queuing techniques, the specifics of which are not pertinent to the present invention.

The method begins at Step 1101, in which the planning time for this iteration of the process is set to the next increment. It may be assumed that in general at this point the process has been running indefinitely, but in a real implementation there will have been a first pass through in which the planning time was set to the earliest accessible time increment following process initialization. In a preferred embodiment based on Iridium, the transmission time increment will be 90 ms, as shown in U.S. Pat. No. 5,603,079 FIG. 6. However, the process does not depend on that specific value, and may use any time increment appropriate to the satellite system being used.

Figure 11B:
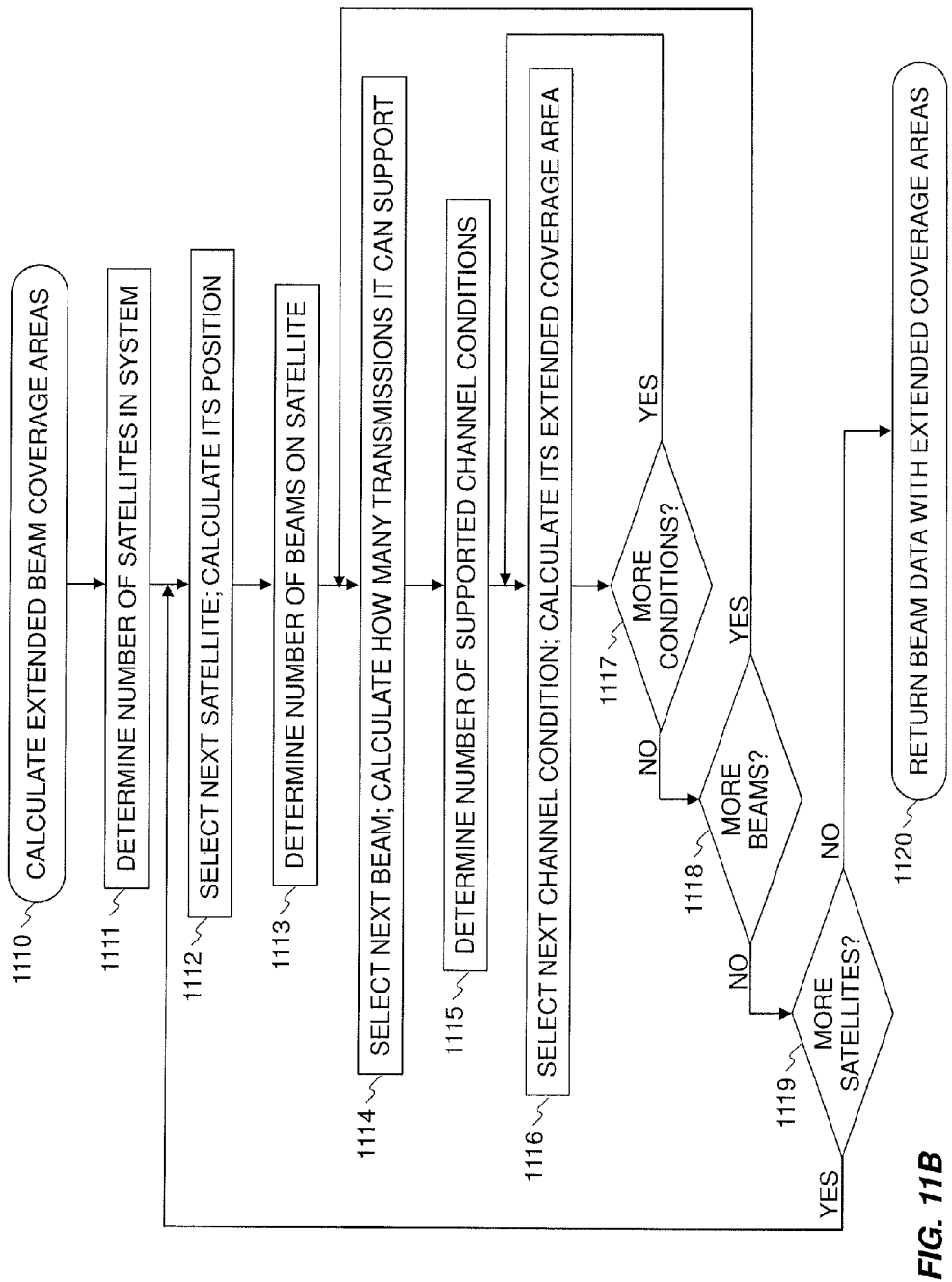

With the planning time now selected, the process advances to Step 1102, in which a subroutine named Calculate Extended Beam Coverage Areas is entered to calculate the Beams and their appropriate Extended Coverage Areas that will exist at the time for which transmissions are being planned, and to determined how many transmission opportunities will be available in each beam at that time. FIG. 11B depicts the flow chart for Subroutine 1110 Calculate Extended Beam Coverage Areas as a set of nested loops that builds a data structure wherein the necessary data will be returned to the calling routine.

The subroutine begins at Step 1111 by determining the number of satellites in the system and entering the outer loop that operates on each satellite in turn. At Step 1112, the procedure picks the next satellite to work on and calculates its position and orientation at the planning time. Position determination is a widely understood calculation, using as input the latest orbit descriptor for the satellite at hand, often called its ephemeris and usually represented in a standard form called the Two-Line Element-set, or TLE. While the TLE may be used in a preferred embodiment, other ephemeris formats exist, and may be used herein without changing the nature of the method. Whether orientation is significant will depend on the satellite system to which the method is being applied. In a preferred embodiment based on Iridium, the antenna pattern is known to be directional, in the sense that the pattern will be arranged on the Earth's surface differently depending on whether the satellite is ascending (traveling northward) or descending (traveling southward). Other satellite systems may exhibit other kinds of orientation dependency, or none at all, without affecting the applicability of the present invention to them.

Next Subroutine 1110 will at Step 1113 determine the number of beams available on the satellite at hand, and enter the second processing loop that operates on each beam in turn. In Step 1114, then, the procedure picks the next beam to work on and calculates how many transmissions it can support at the planning time. This number will depend on such factors as whether the beam is on or off, how many radio frequency channels the satellite is designed or allowed to transmit at the same time, and how much total energy is available on the satellite for emitting radio bursts. The limits will vary according to the physical design of the satellite, its current health and status, and its current mission plan as determined by its operators, and they will differ per satellite system; they may even differ per satellite within a particular system. In a preferred embodiment, the number of transmissions will generally either be one or zero based on mission planning considerations, although higher numbers are possible, so the method described here accommodates any number of available transmission opportunities.

For each beam, at Step 1115 the procedure determines the number of channel conditions supported in the system and enters the innermost loop that operates on each channel condition in turn. Channel condition is used here as the name for any set of parameters that controls the size of a beam's Extended Coverage Area as described above in the context of FIG. 3. Channel conditions include the typical antenna gain of a batch of receivers, such as large, medium, or small aperture, or the typical operating environment of a user group, such as indoors, outdoors, airborne, or maritime. The method works best with a limited number of channel conditions, although any number can be accommodated. In practice the channel conditions will usually be set according to discrete levels of effective radiated power as it rolls off away from a peak at the beam's center. For example, the nominal beam coverage might be the area in which the effective radiated power is 3 dB down from the peak, as projected onto the Earth's surface. The first Extended Coverage Area might be an additional 3 dB down, and so forth. Depending on how powerful the beam peak is, and how many different design points (receiver group channel conditions) are desired, there may be any number of Extended Coverage Areas per beam, from as little as one to as many as ten or more. In a preferred embodiment, an optimal number is likely to be two Extended Coverage Areas per beam, with the first down 9 dB from the peak, which is 6 dB down from the nominal beam edge, and the second down another 6 dB. Channel conditions may also be affected by real-time phenomena such as local weather, space weather, ongoing seismic activity, wildfires, and so forth; if such information is available for a particular target region and the system of implementation is known to be affected by such factors, the selected channel conditions may be adjusted accordingly at this point in the sequence. At Step 1116, then, the procedure picks the next channel condition to compute for the current beam, and calculates its Extended Coverage Area.

Steps 1117, 1118, and 1119 represent loop termination checks. Step 1117 checks whether the innermost loop has finished operating on all the channel conditions for the current beam. If there are more to do, the procedure follows the Yes branch to repeat Step 1116; if not, that loop is done and the procedure follows the No branch to Step 1118. Step 1118 checks whether the middle loop has finished operating on all the beams of the current satellite. If there are more to do, the procedure follows the Yes branch to repeat Step 1114; if not, that loop is done and the procedure follows the No branch to Step 1119. Step 1119 checks whether the outer loop has finished operating on all the satellites in the system. If there are more to do, the procedure follows the Yes branch to repeat Step 1112; if not, that loop is done and the procedure follows the No branch to Step 1120.

Once all satellites, beams, and channel conditions have been processed for the current planning time, the procedure can exit at Step 1120 and return to the calling routine with the results of the calculations, descriptions of every beam's Extended Coverage Area and number of transmission opportunities.

Returning to FIG. 11A, where Step 1102 is now complete, the procedure at Step 1103 checks the broadcast message queue for how many messages are to be delivered at the current planning time, and enters a loop to plan transmissions for each of them. Step 1104 selects the next broadcast message for which to plan delivery. The messages may come to the procedure on a queue or other data structure, as is common in the art. The order of the messages may be determined by any usual mechanism; in the typical application and in a preferred embodiment, they will be prioritized according to various parameters such as customer precedence level and relative aging, via a form of the widely-used weighted fair queuing discipline. Other mechanisms may be used without loss of generality in the present invention.

Figure 11C:
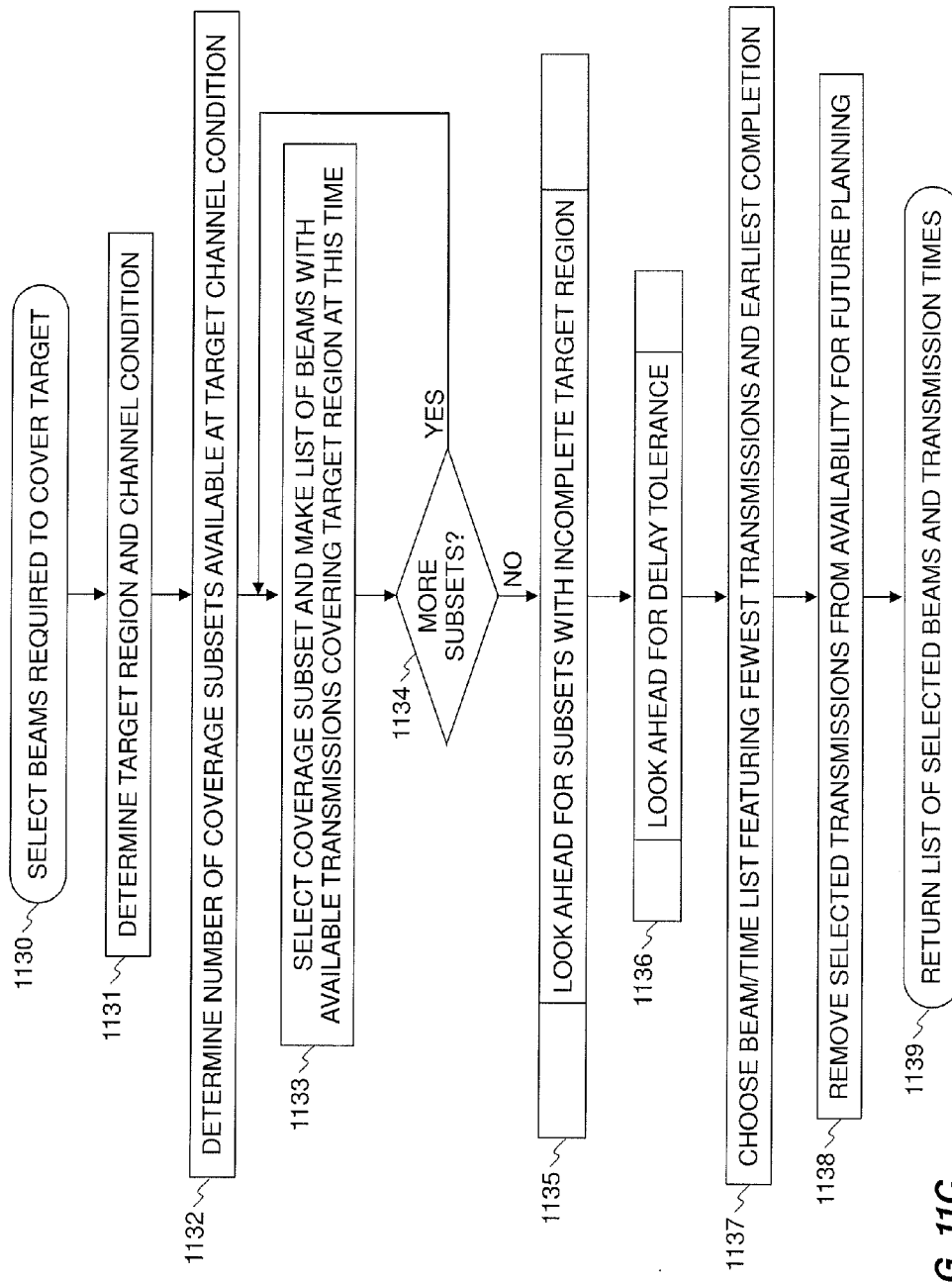

Steps 1105 and 1106 then look at the parameters of the broadcast message to be delivered, and determine its target channel condition and target delivery region, respectively. These terms have been previously explained; their relative geometries will govern what beams are to be used for transmitting the message. To make this determination, the procedure enters a subroutine at Step 1107 named Select Beams Required to Cover Target. This subroutine is depicted in FIG. 11C as Subroutine 1130 of the same name.

Subroutine 1130 begins at Step 1131 reaffirming the target region and channel condition to be covered in this planning cycle. In Step 1132, the procedure overlays the satellite beam geometries at the current planning time with the target region, and ascertains how many distinct coverage subsets, like those depicted in FIG. 8, are available for the target region at the target channel condition. This step results in some number of subsets, over which the procedure will then loop. Inside the loop, Step 1133 picks the next coverage subset and builds a list of beams in that coverage subset whose extended coverage area for the target channel condition touches the target region, and which have an available transmission opportunity at the current planning time. Step 1134 checks the loop end condition. If there are more coverage subsets to process, the subroutine follows the Yes branch to repeat Step 1133. Otherwise, it follows the No branch to Step 1135. At the end of the loop, the procedure has discovered a number of candidates for the transmission plan that is the final aim of the overall procedure, each candidate being a list of beams that have transmission opportunities at the planning time and that deliver the message to some part of the target region at the target coverage area.

Figure 11D:
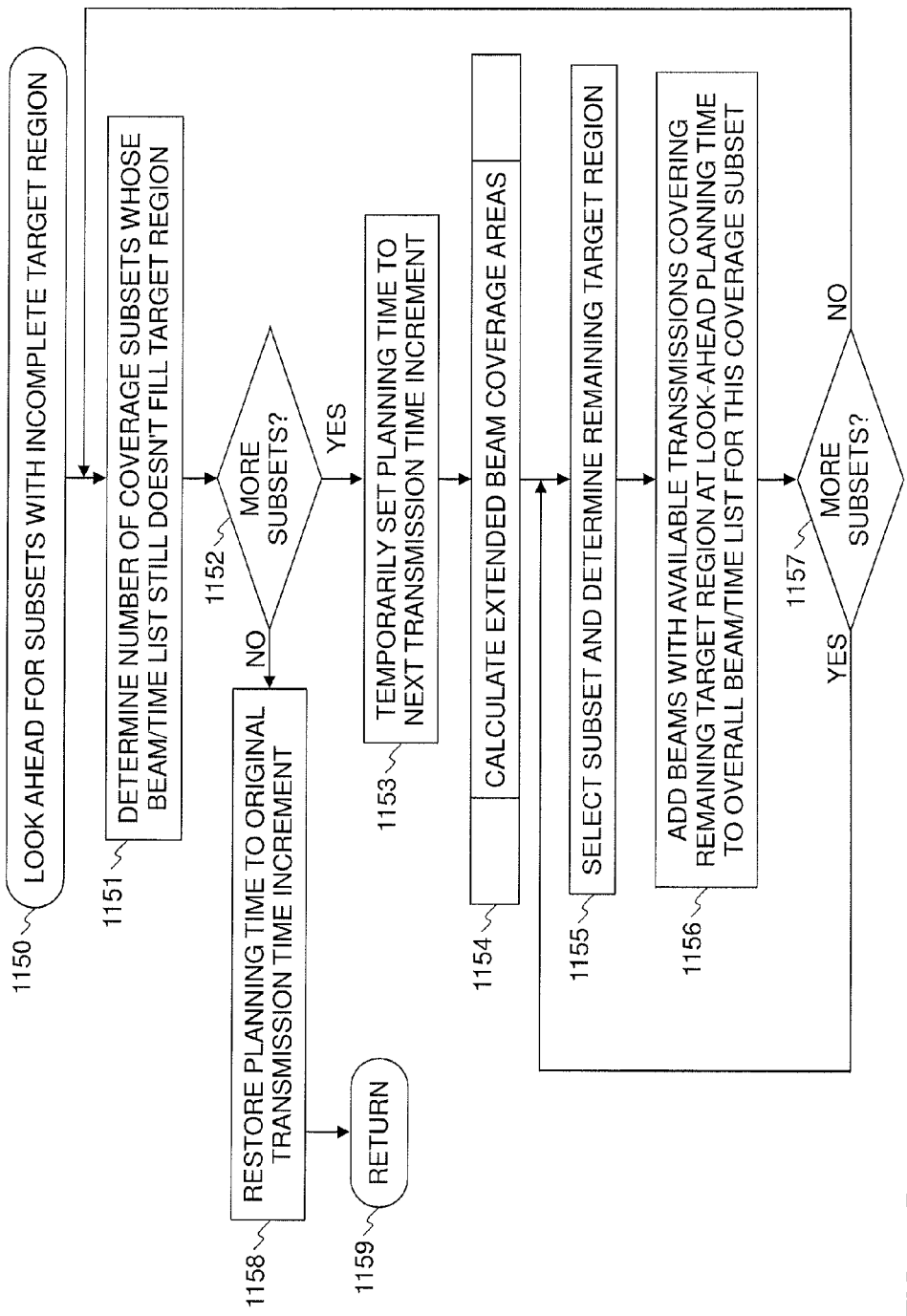

However, at this point in the procedure there is no guarantee that any particular candidate succeeds at delivering the message to the entire target region. Key beams may have no transmission opportunities available at the current planning time, perhaps due to previous iterations of the procedure wherein those transmission opportunities were assigned to another message. Therefore, to ensure that a complete plan is available, the procedure enters a subroutine at Step 1135 that can look ahead to later transmission times for beams that can complete the plan. This subroutine is depicted in FIG. 11D as Subroutine 1150 by the name of Look Ahead for Subsets with Incomplete Target Areas.

Subroutine 1150 begins at Step 1151 by examining the current set of candidate plans to determine how many coverage subsets, which form the basis of each plan, there are whose list of beams and corresponding transmission times (which at the beginning of this subroutine would just be the current planning time) does not cover the target region at the target channel condition. Step 1152 checks whether this number is non-zero, and if so proceeds along the Yes branch to Step 1153. The No branch will be described somewhat later.

Step 1153 remembers the real current planning time, and temporarily advances the planning time to the next transmission time increment. This enables the look-ahead behavior of Subroutine 1150. Step 1154 then calculates new extended beam coverage areas for the new temporary planning time, reusing Subroutine 1110 from FIG. 11B. The reader may refer back to that description if necessary; it will not be repeated here. Upon returning from Subroutine 1110, Step 1154 is complete, and the Subroutine 1150 enters a loop over the coverage subsets that did not completely cover the target region as of the last planning time. Step 1155 then selects the next coverage subset to work on, and determines the remaining target region; that is, it picks a temporary new target region to be associated with the temporary new planning time, said new target region comprising the portion of the original target region that is not illuminated by beams in the current plan for the coverage subset being processed.

At Step 1156, the procedure picks beams from the coverage subset at hand whose extended coverage area contributes to the remaining target region, and which have available transmission opportunities, at the current temporary, or look-ahead, planning time. These beams and the corresponding transmission time are added to the beam list for the coverage subset at hand, thus filling in the transmission plan for this message. Step 1157 checks whether there are more coverage subsets to process at this look-ahead planning time, and if so, the procedure follows the Yes branch to repeat Steps 1155 and 1156. If not, the procedure follows the No branch back to the top of Subroutine 1150, where Step 1151 looks again at whether there are coverage subsets in the master list whose transmission plans still do not cover the target region completely. If there are, which is checked at Step 1152, the look-ahead loop is repeated at the next transmission time increment. Eventually, every candidate coverage subset will have a complete transmission plan that covers the entire target region for the message at hand. At that point, the check at Step 1152 will decide there are no more candidates to work on, and the procedure will follow the No branch to Step 1158, which restores the planning time to the original one remembered upon first entering the look-ahead loop in the main body of Subroutine 1150, and then on to Step 1159 which returns control to Subroutine 1130.

Figure 11E:
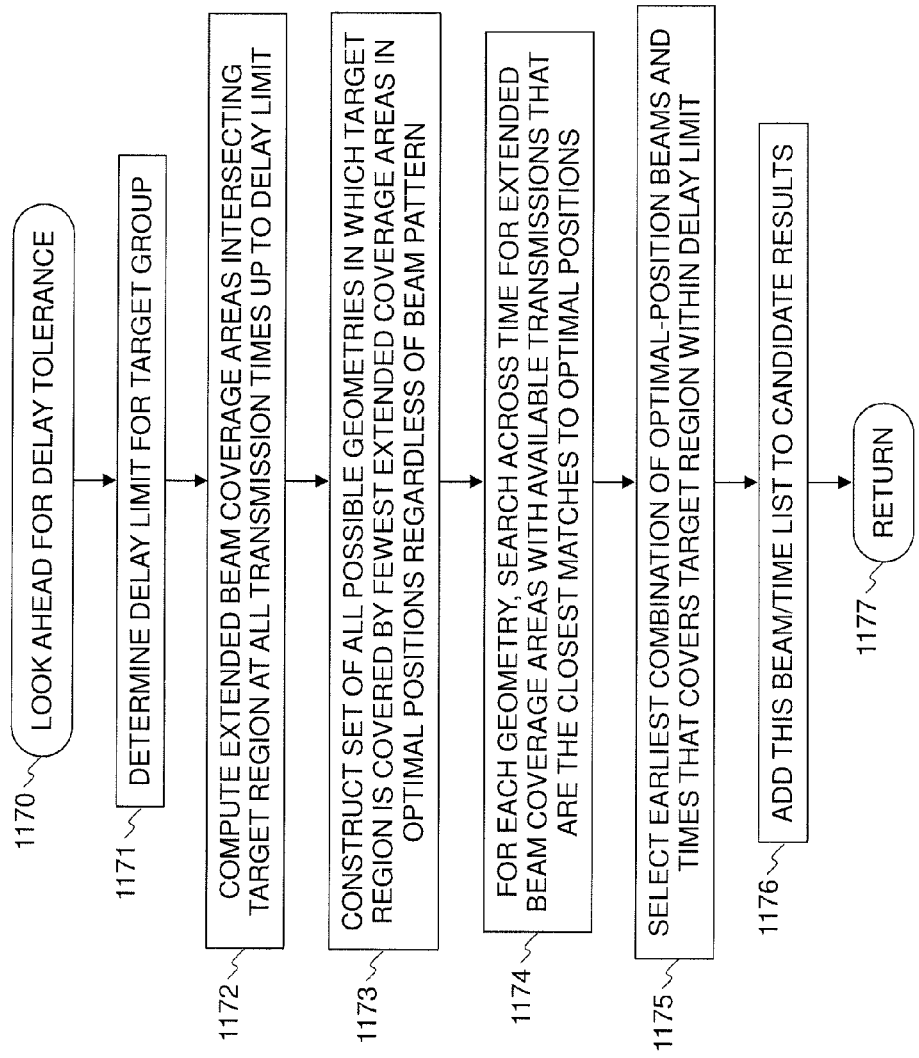

Returning then to FIG. 11C, Step 1135 is now complete. At this point, all the coverage subsets corresponding to FIG. 8 have been considered, and candidate transmission plans assembled for each one. However, the delay tolerance of the target group has not yet been considered, as exemplified by the phenomena shown in FIG. 9 and FIG. 10. Therefore at Step 1136 the procedure enters yet another subroutine to perform another look-ahead that checks whether any later geometries will be acceptable for the message being planned. This final subroutine is depicted in FIG. 11E as Subroutine 1170 by the name of Look Ahead for Delay Tolerance.

Subroutine 1170 begins at Step 1171 by determining the delay limit for the service, or target group, associated with the message at hand. Most groups will probably have some delay tolerance on the order of several seconds or tens of seconds, so only rarely will this step generate a null result that propagates through the rest of the subroutine. Step 1172 then uses the result of Step 1171 to compute extended beam coverage areas that intersect the target region at all transmission time increments from the current planning time out to the provisioned delay limit. Though it is not shown in the diagram, this will involve looping over the look-ahead times and recalculating the satellite positions and coverage areas as in Subroutine 1150, possibly including reuse of Subroutine 1110 or parts of it. Next, Step 1173 constructs a set of all possible geometries in which the target region is covered by the fewest extended coverage areas when they are in optimal positions regardless of time. This is equivalent to finding examples like those in FIG. 9 and FIG. 10.

Step 1174 will then combine the results of Steps 1172 and 1173, for each geometry from Step 1173 searching across time for extended beam coverage areas from Step 1172 that match as closely as possible the optimal beam positions in those geometries, and that have available transmission opportunities. From the resulting intersection, Step 1175 will then select a combination, if any, of optimal-position beams and transmission times that covers the target region within the delay limit using the fewest beams. Only one combination is needed here, so if more than one satisfies the selection criteria the tie will be broken by picking the plan that finishes earliest; this is somewhat arbitrary, because the delay limit would allow any of them, so alternative approaches might pick the latest or even randomly without harming the method. Finally, Step 1176 will add the selected list of beams and times, or plan candidate, to the overall candidate results, and Step 1177 will return control to Subroutine 1130.

Those skilled in the art will appreciate that Subroutines 1150 and 1170 have the potential to run for many iterations of the look-ahead loop, depending on the size of the target region, the number of transmission opportunities available, and in the case of the Subroutine 1170 the magnitude of the delay tolerance. Because these parameters depend on the details of the service offering and the specifics of the satellites, it will be necessary for particular implementations of the present invention to set parameters appropriately according to operational goals. If necessary, bounding steps can be added to the algorithm to, for example, ensure that only so many iterations are considered, or declare success with some portion less than 100% of the target region covered. Such bounds are commonly used and readily envisioned by those skilled in the art, so none are depicted here.

Back on FIG. 11C, Step 1136 is now finished, and the procedure has a set of candidate plans that completely cover the target region at the target channel condition. Step 1137 then picks the candidate plan with the fewest transmissions, and if there are multiple of those it picks from them the one with the earliest completion. This selection becomes the transmission plan for the message at hand. It may include transmissions for both the current planning time and future time increments, and it is possible that the target region is not covered 100% if some bounding condition applied or there simply weren't enough transmission opportunities due to system status, but in any case it will be the optimal plan for the parameters of the message. At Step 1138, the transmission opportunities in the selected plan are claimed, thus removing them from availability for the next round of planning. The resulting plan is then returned to the main procedure via Step 1139.

Upon returning to Process 1100 on FIG. 11A, Step 1107 is now complete, and a transmission plan has been selected for the broadcast message being worked at the current planning time increment. Step 1108 then queues the message for transmission in all of the beams identified in the plan, at their designated times, some of which may be in the future. The implementation of queuing for future transmissions is not specifically detailed in the diagram, and may take any of several forms commonly used for such behaviors. Of particular note, though, is that an implementation must determine whether to support prioritization, and if so whether messages that are processed later when the planning time gets to the time of a previously queued transmission are to be given a preemption right. If so, this may be eased in a preferred embodiment by converting the future transmissions into separate messages with a reduced target region and placing them back in the incoming message queue with the planned transmission time as the new delivery time, rather than maintaining both an incoming message queue and an outgoing transmission queue for later times. This technique will also be useful for handling transmission plans that, despite the best efforts of the algorithm, fail to cover the entire target region.

In a preferred embodiment, the remaining uncovered target region can be used as a new target region for a new copy of the message, enqueued on the inbound side for a later delivery time.

Finally, after all the machinations required to execute the transmission plan have been initiated by Step 1108, Step 1109 checks to see if there are any more messages to process for delivery at the current planning time. If there are, the process follows the Yes branch and repeats beginning at Step 1104. If not, the process follows the No branch back to the top and starts planning the next transmission time increment beginning at Step 1101.

Figure 12:
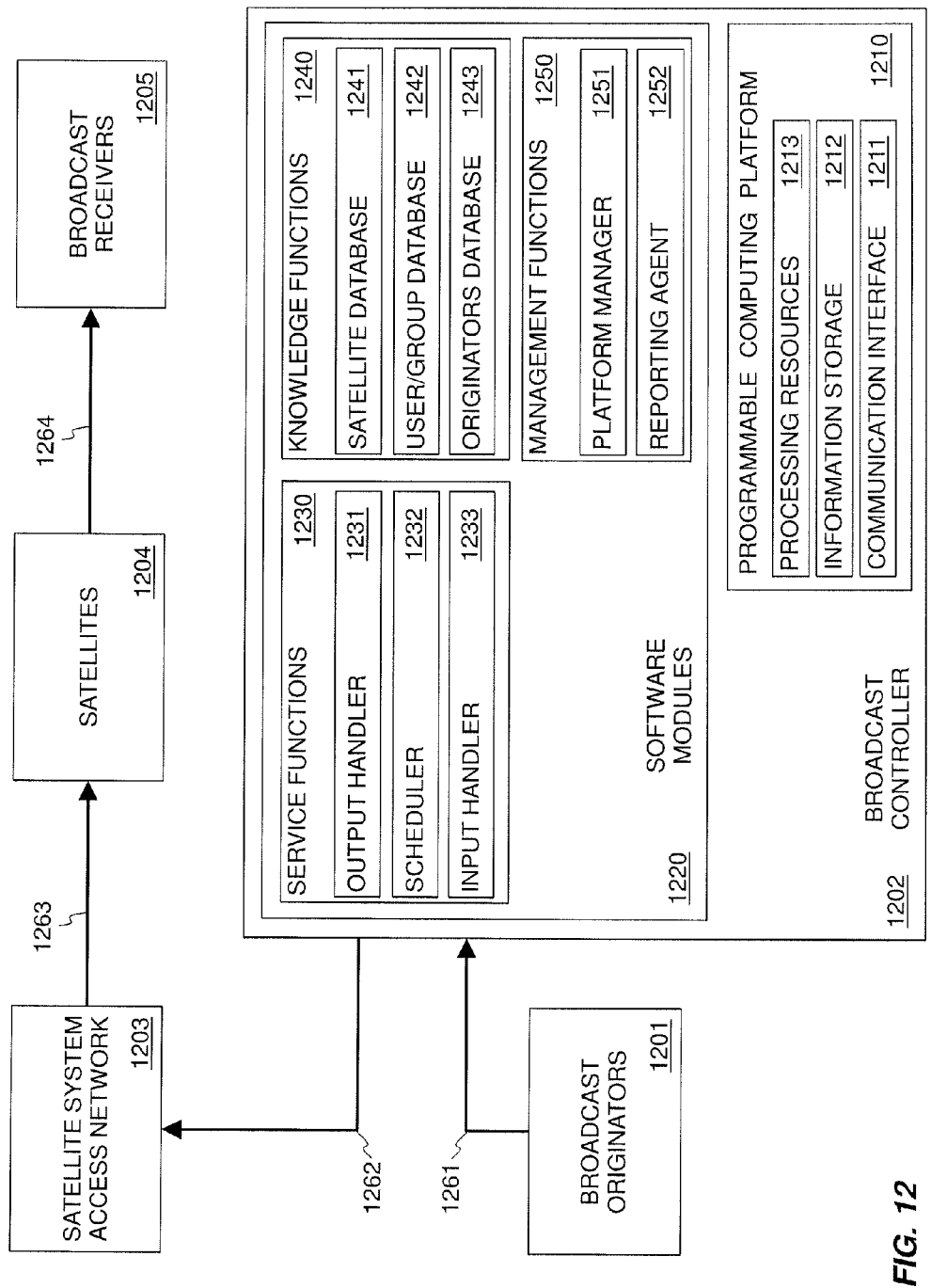
FIG. 12 illustrates a block diagram of a system incorporating the method of FIG. 11 to exploit the coverage phenomena illustrated in FIG. 1 through FIG. 10, in accordance with the principles of the present invention.

FIG. 12 illustrates a block diagram, in accordance with the principles of the present invention, of a system comprising a number of interacting elements and incorporating the method of FIG. 11 to exploit the coverage phenomena illustrated in FIG. 1 through FIG. 10. Broadcast Originators 1201 are entities that may request the delivery of broadcast messages. Details of how Broadcast Originators 1201 work or may be implemented are beyond the scope of the present invention, other than that they send such delivery requests via Interface 1261 to Broadcast Controller 1202. Interface 1261 may be implemented using any commonly available communications medium and protocol. In a preferred embodiment, this interface may use an email-like protocol, or it may use a web-based protocol. Broadcast Controller 1201 receives these requests and handles them as described in Process 1100, resulting in transmission requests to the Satellite System Access Network 1203 that provides access to the relevant satellite system on which the present invention is being applied. Interface 1262 is used to send these transmission requests. Satellite System Access Network 1203 in turn distributes the transmission requests according to its internal details, commanding its Satellites 1204 via Interface 1263 to effect the transmissions as radio frequency bursts in the selected beams at the selected times. These bursts go over Interface 1264 to Broadcast Receivers 1205, which implement radio frequency reception, demodulation, and decoding procedures that are specific to the satellite system being used. In any embodiment, the details of Interfaces 1262, 1263, and 1264, as well as those of Satellite System Access Network 1203, Satellites 1204, and Broadcast Receivers 1205, are specific to the relevant satellite system on which the present invention is being applied, and may vary widely without affecting the applicability of the present invention to them. In a preferred embodiment using the Iridium system, these aspects may be similar to what is taught in the various U.S. patents previously cited.

More detail on Broadcast Controller 1202 is pertinent, because it executes Process 1100, thereby embodying the core of the present invention. Broadcast Controller 1202 comprises components that implement its logical functions and specific behavior. Programmable Computing Platform 1210 consists of Processing Resources 1213, Information Storage 1212, and Communication Interface 1211, all of which are commonly available and well known technologies. The only requirements imposed upon them for use in Broadcast Controller 1202 are that they be sized to accommodate the processing, information, and communication load anticipated for a particular deployment. Software Modules 1220 specifically encode the logical functions and detailed behavior of Broadcast Controller 1202. More information on each set of functions is provided in the following paragraphs.

The Management Functions 1250 are provided in order to allow a system operator or service provider to operate, administer, and maintain the device. These are common functions well known to those skilled in the art, which are provided in all such controllers. Platform Manager 1251 handles configuring the hardware and software, detecting and recovering from faults that may occur, recording events and statistics, and securing access to the device for only authorized personnel. Reporting Agent 1252 handles forwarding reports, such as faults, significant events, and statistics, to other systems that may be used by an operator to monitor network elements.

Knowledge Functions 1240 embody the information and data needed by Broadcast Controller 1202 to do its job, and in particular to execute Process 1100. Satellite Database 1241 incorporates the status and resources of all satellites that may be used to deliver broadcast messages. The specific information required is described in the context of Process 1100. User/Group Database 1242 embodies the information about services available to each user or group. Data items described in the context of Process 1100 that are included in this database are delay limits, service processing bounds if any, and defaults for target region and channel condition in case a specific message delivery request did not include them. Other information in this database would include billing and usage data. Originators Database 1243 contains the information needed to authenticate Broadcast Originators 1201, and ensure that they only send broadcast messages to permitted groups and regions. Defaults may be recorded here for target users and groups, in case they're not identified in an incoming delivery request. Defaults may be recorded here as well for target regions and channel conditions. Other information in this database would include billing and usage data.

How the Databases 1241, 1242, and 1243 are populated and kept current over time is a matter specific to the satellite system being used and the service operation in which Broadcast Controller 1202 is deployed, but it will generally be accomplished by periodic updates delivered through the capabilities inherent in Management Functions 1250.

Service Functions 1230 implement the detailed sequences of Process 1100, as well as the ancillary interface handling required to bring broadcast message delivery requests into the Broadcast Controller 1202, queue them according to the service logic, and send out transmission requests. Input Handler 1233 serves Interface 1261, receiving delivery requests from Broadcast Originators 1201, and queues them as messages for processing. Scheduler 1232 implements the details of Process 1100 as described earlier. Output Handler 1231 serves Interface 1262, sending the transmission requests that result from Process 1100 out to Satellite System Access Network 1203.

Various internal interactions that will be obvious to those skilled in the art are also implemented among the components of Software Modules 1220, as well as between them and the components of Programmable Computing Platform 1210. These are not depicted in order to avoid the clutter they would entail; their details may be implemented in numerous ways not pertinent to the novel aspects of the present invention.

The invention has been described above with reference to preferred embodiments and specific applications. It is not intended that the invention be limited to the specific embodiments and applications shown and described, but that the invention be limited in scope only by the claims appended hereto. It will be evident to those skilled in the art that various substitutions, modifications, and extensions may be made to the embodiments as well as to various technologies which are utilized in the embodiments. It will also be appreciated by those skilled in the art that such substitutions, modifications, and extensions fall within the spirit and scope of the invention, and it is intended that the invention as set forth in the claims appended hereto includes all such substitutions, modifications, and extensions.

What is claimed is:

1. A method of reducing power usage of a multi-beam satellite system, comprising:
   determining a coverage area, for a particular beam from a multi-beam satellite system, based on a channel condition of a user device independent of transmission power associated with said particular beam; and
   adjusting a transmission parameter, independent of said transmission power, associated with said particular beam to transmit a data message to said user device based on said channel condition;
   wherein said adjusted transmission parameter reduces power usage of said multi-beam satellite system.

2. The method of reducing power usage of a multi-beam satellite system according to claim 1, further comprising:
   simultaneously outputting a first data message to said user device with a first beam from said multi-beam satellite system and a second data message to said user device with a second beam from said multi-beam satellite system.

3. The method of reducing power usage of a multi-beam satellite system according to claim 2, further comprising:
   simultaneously outputting a third data message to said user device with a third beam from said multi-beam satellite system.

4. The method of reducing power usage of a multi-beam satellite system according to claim 1, wherein:
   said adjusted transmission parameter is a reduced number of transmissions from said particular beam to said user device.

5. The method of reducing power usage of a multi-beam satellite system according to claim 1, further comprising:
   said adjusted transmission parameter is a scheduled data transmission to said user device.

6. The method of reducing power usage of a multi-beam satellite system according to claim 1, wherein:
   said channel condition is an ionospheric distortion associated with a location of said user device.

7. The method of reducing power usage of a multi-beam satellite system according to claim 1, wherein:
   said channel condition is a real-time weather condition associated with a location of said user device.

8. The method of reducing power usage of a multi-beam satellite system according to claim 1, wherein:
   said channel condition is a desired building penetration.

9. The method of reducing power usage of a multi-beam satellite system according to claim 1, wherein:
   said channel condition is an antenna gain associated with said user device.

10. The method of reducing power usage of a multi-beam satellite system according to claim 1, wherein:
    said channel condition is a distance between said particular beam and said user device.

11. The method of reducing power usage of a multi-beam satellite system according to claim 1, wherein:
    said data message is addressed to a unique group of user devices.

12. The method of reducing power usage of a multi-beam satellite system according to claim 1, wherein:
    said multi-beam satellite system is a Low Earth Orbit (LEO) satellite system.

13. The method of reducing power usage of a multi-beam satellite system according to claim 1, wherein:
    said multi-beam satellite system is a Medium Earth Orbit (MEO) satellite system.

14. The method of reducing power usage of a multi-beam satellite system according to claim 1, wherein:
    said multi-beam satellite system is a broadcast satellite system.

15. The method of reducing power usage of a multi-beam satellite system according to claim 1, further comprising:
    retrieving said data message from a broadcast message queue.

16. The method of reducing power usage of a multi-beam satellite system according to claim 15, wherein:
    a plurality of data messages within said broadest message queue are prioritized.

17. The method of reducing power usage of a multi-beam satellite system according to claim 1, further comprising:
    scheduling a transmission of a queued data message to said user device based on a projected coverage area.

18. A system for reducing power usage of a multi-beam satellite system, comprising:
    a broadcast controller to determine a coverage area for a particular beam from a multi-beam satellite system based on a channel condition of a user device independent of transmission power associated with said particular beam, and adjust a transmission parameter, independent of said transmission power, associated with said particular beam to transmit a data message to said user device based on said channel condition; and
    an output handler to output said data message, via a satellite system access network, to a user device;
    wherein said adjusted transmission parameter reduces power usage of said multi-beam satellite system.

19. The system for reducing power usage of a multi-beam satellite system according to claim 18, wherein:
    said output handler simultaneously outputs a first data message to said satellite system access network for transmission with a first beam from said multi-beam satellite system and a second data message to said satellite system access network for transmission with a second beam from said multi-beam satellite system.

20. The system for reducing power usage of a multi-beam satellite system according to claim 19, wherein:
    said output handler simultaneously outputs a third data message to said satellite system access network for transmission with a third beam from said multi-beam satellite system.

21. The system for reducing power usage of a multi-beam satellite system according to claim 18, wherein:
    said adjusted transmission parameter is a reduced number of transmissions from said particular beam to said user device.

22. The system for reducing power usage of a multi-beam satellite system according to claim 18, wherein:
    said adjusted transmission parameter is a scheduled data transmission to said user device.

23. The system for reducing power usage of a multi-beam satellite system according to claim 18, wherein:
    said channel condition is an ionospheric distortion associated with a location of said user device.

24. The system for reducing power usage of a multi-beam satellite system according to claim 18, wherein:
    said channel condition is a real-time weather condition associated with a location of said user device.

25. The system for reducing power usage of a multi-beam satellite system according to claim 18, wherein:
    said channel condition is a desired building penetration.

26. The system for reducing power usage of a multi-beam satellite system according to claim 18, wherein:
    said channel condition is an antenna gain associated with said user device.

27. The system for reducing power usage of a multi-beam satellite system according to claim 18, wherein:
said channel condition is a distance between said particular beam and said user device.

28. The system for reducing power usage of a multi-beam satellite system according to claim 18, wherein:
said data message is addressed to a unique group of user devices.

29. The system for reducing power usage of a multi-beam satellite system according to claim 18, wherein:
said multi-beam satellite system is a Low Earth Orbit (LEO) satellite system.

30. The system for reducing power usage of a multi-beam satellite system according to claim 18, wherein:
said multi-beam satellite system is a Medium Earth Orbit (MEO) satellite system.

31. The system for reducing power usage of a multi-beam satellite system according to claim 18, wherein:
said multi-beam satellite system is a broadcast satellite system.

32. The system for reducing power usage of a multi-beam satellite system according to claim 18, wherein:
said broadcast controller retrieves said data message from a broadcast message queue.

33. The system for reducing power usage of a multi-beam satellite system according to claim 32, wherein:
a plurality of data messages within said broadcast message queue are prioritized.

34. The system for reducing power usage of a multi-beam satellite system according to claim 18, wherein:
said broadcast controller schedules a transmission of a queued data message to said user device based on a projected coverage area.

35. A broadcast controller device, comprising:
an input handler to receive a delivery request for a data message from a broadcast originator device;
a scheduler to determine a coverage area, for a particular beam from a multi-beam satellite system, based on a reception parameter independent of transmission power associated with said particular beam, and adjust a transmission parameter, independent of said transmission power, associated with said particular beam to transmit said data message to a user device; and
an output handler to send transmission requests associated with said data message to a satellite system access network;
wherein said adjusted transmission parameter reduces power usage of said multi-beam satellite system.

36. The broadcast controller device according to claim 35, further comprising:
a queue to queue said data message for transmission to said satellite system access network.

37. The broadcast controller device according to claim 35, further comprising:
a satellite database to incorporate status and resource information of all satellites that may be used to deliver broadcast data messages.

38. The broadcast controller device according to claim 35, further comprising:
an originators database to contain information needed to authenticate broadcast originators, and ensure said authenticated broadcast originators only send broadcast messages to permitted groups and regions.

39. The broadcast controller device according to claim 38, wherein said originators database further comprises:
defaults for at least one of target users, target groups, target regions, and channel conditions.

40. The broadcast controller device according to claim 38, wherein said originators database further comprises:
at least one of billing and usage data.

41. The broadcast controller device according to claim 35, further comprising:
a user/group database to include at least one of delay limits, service processing bounds, defaults for a target region, and defaults for a channel condition.

42. The broadcast controller device according to claim 41, wherein said user/group database further comprises:
billing and usage data.

* * * * *